(12) United States Patent
Francis

(10) Patent No.: US 11,685,226 B2
(45) Date of Patent: Jun. 27, 2023

(54) AUTOMOBILE AIR CONDITIONING UNIT LEAK DETECTION DEVICE

(71) Applicant: Basden Francis, Pembroke Pines, FL (US)

(72) Inventor: Basden Francis, Pembroke Pines, FL (US)

(*) Notice: Subject to any disclaimer, the term of this patent is extended or adjusted under 35 U.S.C. 154(b) by 123 days.

(21) Appl. No.: 16/505,171

(22) Filed: Jul. 8, 2019

(65) Prior Publication Data
US 2021/0008957 A1 Jan. 14, 2021

(51) Int. Cl.
B60H 1/00 (2006.01)
G01D 5/26 (2006.01)

(52) U.S. Cl.
CPC .......... *B60H 1/00585* (2013.01); *G01D 5/26* (2013.01)

(58) Field of Classification Search
CPC .......... B60H 1/00585; F25B 2345/005; F25B 2500/222; F25B 2500/22; F24F 11/36
See application file for complete search history.

(56) References Cited

U.S. PATENT DOCUMENTS

| | | | | |
|---|---|---|---|---|
| 4,879,546 A * | 11/1989 | Dunham | ............ | G01N 33/0049 73/24.01 |
| 6,085,576 A * | 7/2000 | Sunshine | ........... | G01N 33/0031 73/29.01 |
| 6,089,076 A * | 7/2000 | Mueller | .................. | G01M 3/38 250/339.01 |
| 6,647,761 B2 * | 11/2003 | Barjesteh | .............. | G01M 3/228 73/40 |
| 2003/0010093 A1 * | 1/2003 | Barjesteh | .............. | G01M 3/228 73/40 |
| 2004/0168505 A1 * | 9/2004 | Dudley | .............. | B60H 1/00585 73/40.7 |

(Continued)

FOREIGN PATENT DOCUMENTS

| | | | | |
|---|---|---|---|---|
| EP | 0806652 A2 * | 11/1997 | ............. | G01M 3/38 |
| JP | 2001519903 A * | 10/2001 | ............. | G01M 3/24 |

OTHER PUBLICATIONS

Fluke Ti200, Ti300, Ti400, Ti450, Ti450SF6, Ti480 Infrared Camera Users Manual Sep. 2013, Rev. 4, 6/17 © 2013-2017 Fluke Corporation. (Year: 2013).*

(Continued)

*Primary Examiner* — Emmanuel E Duke
(74) *Attorney, Agent, or Firm* — Kimberly McLean, esq.; McLean Law LLC

(57) ABSTRACT

An automobile air conditioning unit leak detection device including a detection unit, a control unit, and a probe unit. The detection unit includes a sound detector member and a camera member. Each member is able to detect a leak from the air conditioning unit. The control unit includes a housing member having a pair of strap elements for attaching the housing member to a wearer's wrist. The housing member includes a display element for outputting a viewable image received from the camera member, and a speaker element for outputting one or more sound waves received from the sound detector member. The probe unit includes an elongated flexible cable member having the detection unit attached at a distal end and the control unit attached at a proximate end. The flexible cable member transmits one or more signals between the control unit and the detection unit.

14 Claims, 1 Drawing Sheet

(56) References Cited

U.S. PATENT DOCUMENTS

| | | | | |
|---|---|---|---|---|
| 2005/0126264 A1* | 6/2005 | Komninos | ............... | G01M 3/24 |
| | | | | 73/40.5 A |
| 2008/0277586 A1* | 11/2008 | Cardinale | .......... | G01N 21/3504 |
| | | | | 250/339.13 |
| 2013/0245965 A1* | 9/2013 | Kane | .................. | G05B 23/0264 |
| | | | | 702/33 |
| 2016/0370327 A1* | 12/2016 | Moldover | ............. | G01N 29/036 |
| 2017/0234762 A1* | 8/2017 | Lu | ............................ | G01M 3/38 |
| | | | | 250/459.1 |
| 2019/0170384 A1* | 6/2019 | McQuade | ............... | F25B 49/02 |
| 2019/0170603 A1* | 6/2019 | Gupte | .................. | F25B 49/005 |

OTHER PUBLICATIONS

Fluke (Ti200, Ti300, Ti400, Ti450, Ti450SF6, Ti480, Thermal Imager User Manual © Sep. 2013, Rev 4) (Year: 2013).*

* cited by examiner

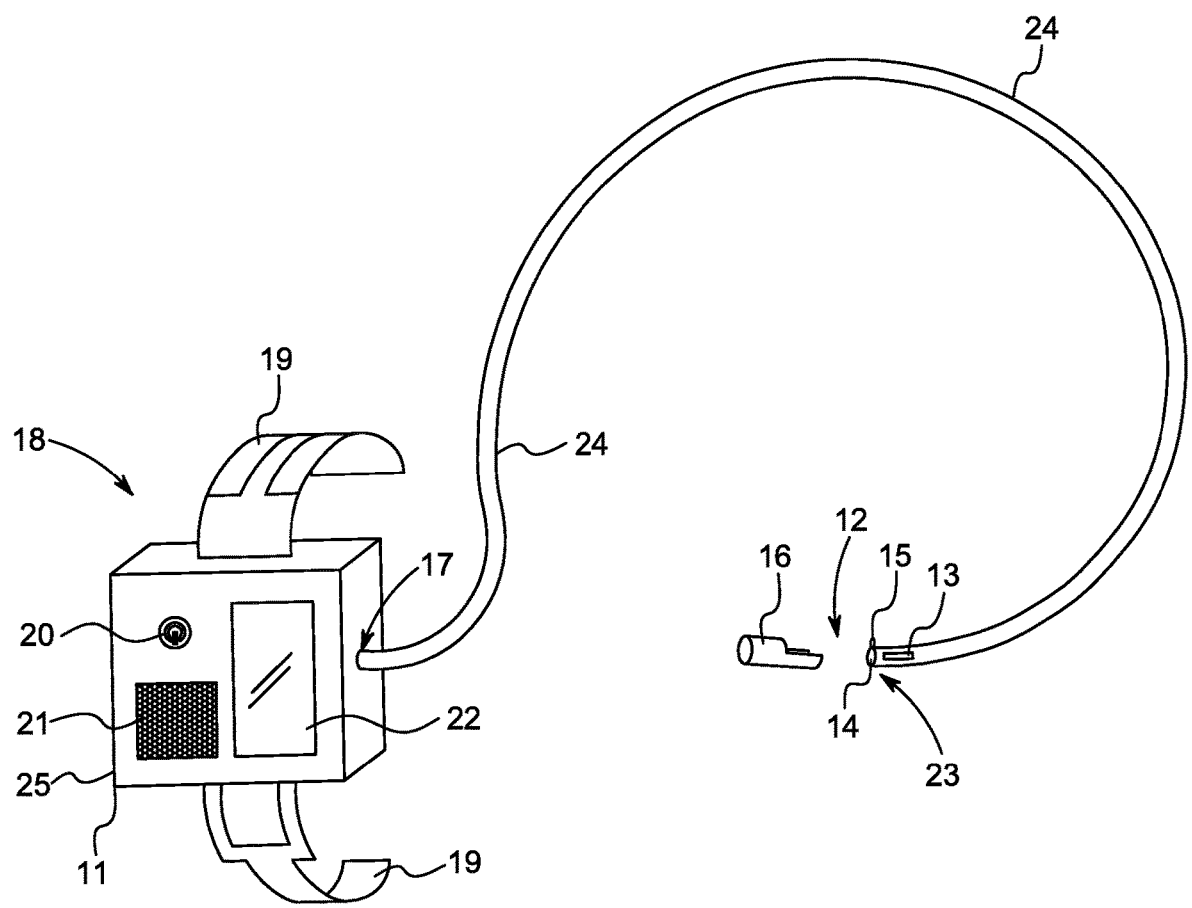

AUTOMOBILE AIR CONDITIONING UNIT LEAK DETECTION DEVICE

FIELD OF THE INVENTION

Embodiments described herein generally relate to leak detection devices, and more particularly to an automobile air conditioning unit leak detection unit.

BACKGROUND OF THE INVENTION

Traditionally it takes a major mechanical failure for consumers to realize that the air conditioning unit in their automobile is leaking. This can be problematic because it can be time consuming, tedious and costly to repair a neglected leak. Hence, it is desirable to provide an efficient way of detecting an air conditioning unit leak before a major mechanical failure occurs.

BRIEF DESCRIPTION OF THE DRAWINGS

The various advantages of the embodiments of the present disclosure will become apparent to one skilled in the art by reading the following specification and appended claims, and by referencing the following drawing(s), in which:

FIG. 1 shows an exemplary view of an automobile air conditioning unit leak detection device according to an embodiment of the present disclosure.

SUMMARY OF THE INVENTION

Exemplary embodiments disclosed herein describe an automobile air conditioning unit leak detection device including a detection unit, a control unit, and a probe unit. The detection unit includes a sound detector member and a camera member. Each member is able to detect a leak from the air conditioning unit. The sound detector member detects a leak from the air conditioning unit based on pressure sensing. The camera member detects a leak from the air conditioning unit based on image sensing using an ultraviolet (UV) lens. The control unit includes a housing member having a pair of strap elements for attaching the housing member to a wearer's wrist. The housing member includes a display element for outputting a viewable image received from the camera member, and a speaker element for outputting one or more sound waves received from the sound detector member. The probe unit includes an elongated flexible cable member having the detection unit attached at a distal end and the control unit attached at a proximate end. The flexible cable member transmits one or more signals between the control unit and the detection unit.

In some exemplary embodiments, the sound detector member and the camera member are each able to detect a leak from the air conditioning unit independently of one another.

In some exemplary embodiments, the detection unit further includes an ultraviolet (UV) light.

In some exemplary embodiments, the ultraviolet (UV) lens is a purple UV lens.

In some exemplary embodiments, the UV light emits radiation causing any particle within the range of the emitted radiation to fluoresce and become viewable as an image on the camera member.

In some exemplary embodiments, the fluoresce particle is viewable on the camera member using the purple UV lens.

In some exemplary embodiments, the particle includes at least one from the group comprising i) gas and ii) oil.

In some exemplary embodiments, the UV lens is detachable from the flexible cable.

In some exemplary embodiments, the sound detector includes at least one sound sensor having at least one microphone.

In some exemplary embodiments, the sound detector detects a leak when the at least one sound sensor senses a low to high intensity sound.

In some exemplary embodiments, the flexible cable is held in a user's hand or by the user's fingers so that the flexible cable may be positioned at a desired location so that a leak from the air conditioning unit may be detected.

In some exemplary embodiments, the viewable image on the camera member is mirrored on the display element.

In some exemplary embodiments, the housing member includes a capture switch element to initiate a capturing of the viewable image mirrored on the display.

In some exemplary embodiments, the housing member includes a memory slot element for receiving a memory card.

In some exemplary embodiments, the housing member includes a power button element for powering the device.

In some exemplary embodiments, the housing member includes a charging port element for charging the device.

In some exemplary embodiments, the housing member includes magnify and de-magnify button elements for amplifying and de-amplifying the image received from the camera member.

DETAILED DESCRIPTION

The present disclosure relates to an automobile air conditioning ("AC") unit leak detection device ("the device"). The device is able to detect gas or oil leaks from the AC core, the joint or the compressor. The device includes an elongated probe having a small diameter which allows the probe to be inserted in narrow spaces within an automobile engine, near the AC unit to detect leaks. The probe has a detection unit attached to it at one end and the detection unit operates to detect leaks.

As illustrated in FIG. 1, the device 10 includes detection unit 12, control unit 18 and probe unit 24. The detection unit is located at a distal end 23 of the probe unit. The detection unit includes a sound detector member 13, a camera member 14, an ultraviolet ("UV") light 15 and an ultraviolet ("UV") lens 16. A leak in an AC unit may be detected independently by the sound detector member 13, or by the camera member 14. Further, a leak in the AC unit may be detected collectively by the sound detector member 13 and the camera member 14.

The sound detector member 13 detects a leak in the AC unit based on pressure sensing. The sound detector member is integrated into the probe unit 24 and includes at least one sound sensor having at least one microphone and processing circuitry. The microphone detects and measures sound pressure from received sound waves and the processing circuitry determines the sound intensity.

The sound waves received by the microphone may correspond to particle drippings, such as, for example, oil drippings escaping from an enclosed source with a crack/hole. The processing circuitry may determine the sound intensity from the measured sound pressure. Alternatively, the processing circuitry may determine the sound intensity by any suitable means. The sound detector detects a leak in the AC unit when a low to high intensity sound is detected by the sound sensor. The worse the leak, the higher the pitch sound.

The camera member 14 detects a leak in the AC unit based on image sensing. A leak is detected in the AC unit by the camera member when a particle, such as, for example, gas or oil, is viewed by the camera member from the positioned location of the probe unit 24. Although the disclosure describes the particle as gas or oil, any particles may be used. An image may be sensed and viewed directly from the camera member (i.e., for visible particles) or indirectly from an UV lens 16 (i.e., for natively invisible/transparent particles) which is attached to the camera member. The camera member is a micro camera which is integrated into the probe unit 24. The UV lens 16 is attachably connected to the camera member and may be detached from the camera member so that the camera member may operate without the UV lens or with a different type of lens.

The UV lens 16 may be any suitable lens. In a preferred embodiment, the UV lens is a purple UV lens. The purple UV lens allows particles that are intrinsically transparent, such as, for example, gas, to be seen when radiation is emitted upon the particle. The UV light 15 is located immediately above the camera member and emits radiation (from the light) which causes some particles within the range of the emitted radiation to fluoresce and become viewable through the purple UV lens as an image on the camera member. The UV light also aids in providing clarity of the viewable images. Any suitable UV light may be used. In an alternative embodiment, a light emitting diode (LED) light is used.

The control unit 18 includes a housing member 11 having a pair of strap elements 19, a power button element 20, a speaker element 21, a display element 22, a charging port element 25, magnify and de-magnify button elements (not shown), a memory slot element (not shown) and a capture switch element (not shown). The housing member houses all of the elements and may be made from any suitable material.

The pair of strap elements 19 may be used to attach the housing member 11 to a user's wrist. The pair of strap elements may be made from any suitable material, such as, for example, plastic, and the strap elements may be implemented from any mechanism, such as, for example, Velcro or snap fasteners.

The power button element 20 includes a switch which powers on the device. When the power button element is depressed (i.e., pressed inwards) the detection unit 12, the display element 22, and the speaker element 21 are activated. The speaker element 21 outputs data (e.g., audible sound waves) received from the sound detector member 13. The output data may include any sound waves detected by the sound detector 13. Any suitable speaker for outputting audible data may be used. The display element 22 allows to user to see the images viewable from camera member 14. All of the viewable images at the camera member 14 are mirrored at the display element 22. The display element may be implemented using any suitable display. In a preferred embodiment, the display is a camera screen. The display may be any accommodating suitable size for the housing member 11. In a preferred embodiment, the display is three inches by two inches.

The capture switch element is located on the housing member and allows a user to capture a photograph of the viewable images shown on the display element 22. When the switch is activated, a photograph of the image is captured. The memory slot element is configured to receive a memory card, such as, for example, a SD card, for storing the capturing images (i.e., photographs).

The charging port element 25 is configured to receive a power cable/cord to recharge a battery used with the device. The device may be battery operated and may operate with rechargeable lithium batteries. The magnify and de-magnify button elements are used to amplify and de-amplify the images shown on the display element 22.

The probe unit 24 includes an elongated flexible cable having the detection unit 12 attached thereto at a distal end 23 and having the control unit 18 attached thereto at a proximate end 17. The flexible cable transmits one or more signals between the detection unit and the control unit. The flexible cable may be held in a user's hand or by the user's fingers to position the distal end of the cable at a desired location near the AC unit in an automobile engine so that a leak from the AC unit may be detected.

The flexible cable may be any suitable length. In a preferred embodiment, the flexible cable is thirty-two inches long. The diameter of the flexible cable may be small so as to allow the cable to be inserted into small spaces. The flexible cable may be made from any suitable material which allows the efficient transfer of signals therethrough.

It is understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.)

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art. However, should the present disclosure give a specific meaning to a term deviating from a meaning commonly understood by one of ordinary skill, this meaning is to be taken into account in the specific context this definition is given herein.

Those skilled in the art will appreciate from the foregoing description that the broad techniques of the embodiments of the present invention may be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

What is claimed is:

1. An automobile air conditioning unit leak detection device comprising: a detection unit including a sound detector member and a camera member, each member being able to detect a leak from the air conditioning unit, the sound detector member including a sound sensor having a microphone and processing circuitry, the microphone detects and measures sound pressure from received sound waves and the processing circuitry determines the sound intensity based on the measured sound pressure, and the sound detector member detects a leak from the air conditioning unit based on the determined sound intensity, and the camera member detects a leak from the air conditioning unit based on image sensing using an ultraviolet (UV) lens; a control unit including a housing member having a pair of strap elements for attaching the housing member to a wearer's wrist, the housing member including a display element for outputting a viewable image received from the camera member, and a speaker for outputting one or more sound waves received from the sound detector member; and a probe unit including an elongated flexible cable having the detection unit attached thereto at a distal end and having the control unit attached thereto at a proximate end, wherein the flexible cable transmits one or more signals between the control unit and the detection unit, wherein the sound detector detects the leak in the AC unit when a low to high intensity sound is detected by the sound sensor; and wherein the leak in the air conditioning unit may be detected collectively by the sound detector member and the camera member.

2. The device of claim 1 wherein the sound detector member and the camera member are each able to detect a leak from the air conditioning unit independently of one another.

3. The device of claim 1 wherein the detection unit further includes an ultraviolet (UV) light.

4. The device of claim 3 wherein the UV light emits radiation causing particles within the range of the emitted radiation to fluoresce and become viewable as an image on the camera member.

5. The device of claim 4, wherein the particle includes at least one from the group comprising i) gas and ii) oil.

6. The device of claim 1 wherein the ultraviolet lens is a purple UV lens.

7. The device of claim 6, wherein the fluoresce particle is viewable on the camera member using the purple UV lens.

8. The device of claim 1, wherein the UV lens is detachable from the flexible cable.

9. The device of claim 1, wherein the viewable image on the camera member is duplicated on the display element.

10. The device of claim 9, wherein the housing member includes a capture switch element to initiate a capturing of the viewable image mirrored on the display.

11. The device of claim 1, wherein the housing member includes a memory slot element for receiving a memory card.

12. The device of claim 1, wherein the housing member includes a power button element for powering the device.

13. The device of claim 1, wherein the housing member includes a charging port element for charging the device.

14. The device of claim 1, wherein the housing member includes magnify and a de-magnify button elements for amplifying and de-amplifying the image received from the camera member.

* * * * *